June 5, 1945.
M. J. O. LOBELLE
2,377,794
APPARATUS FOR SUPPLYING PRESSURE AIR
TO AIRCRAFT, VEHICLES, AND BOATS
Filed April 17, 1943
2 Sheets-Sheet 1
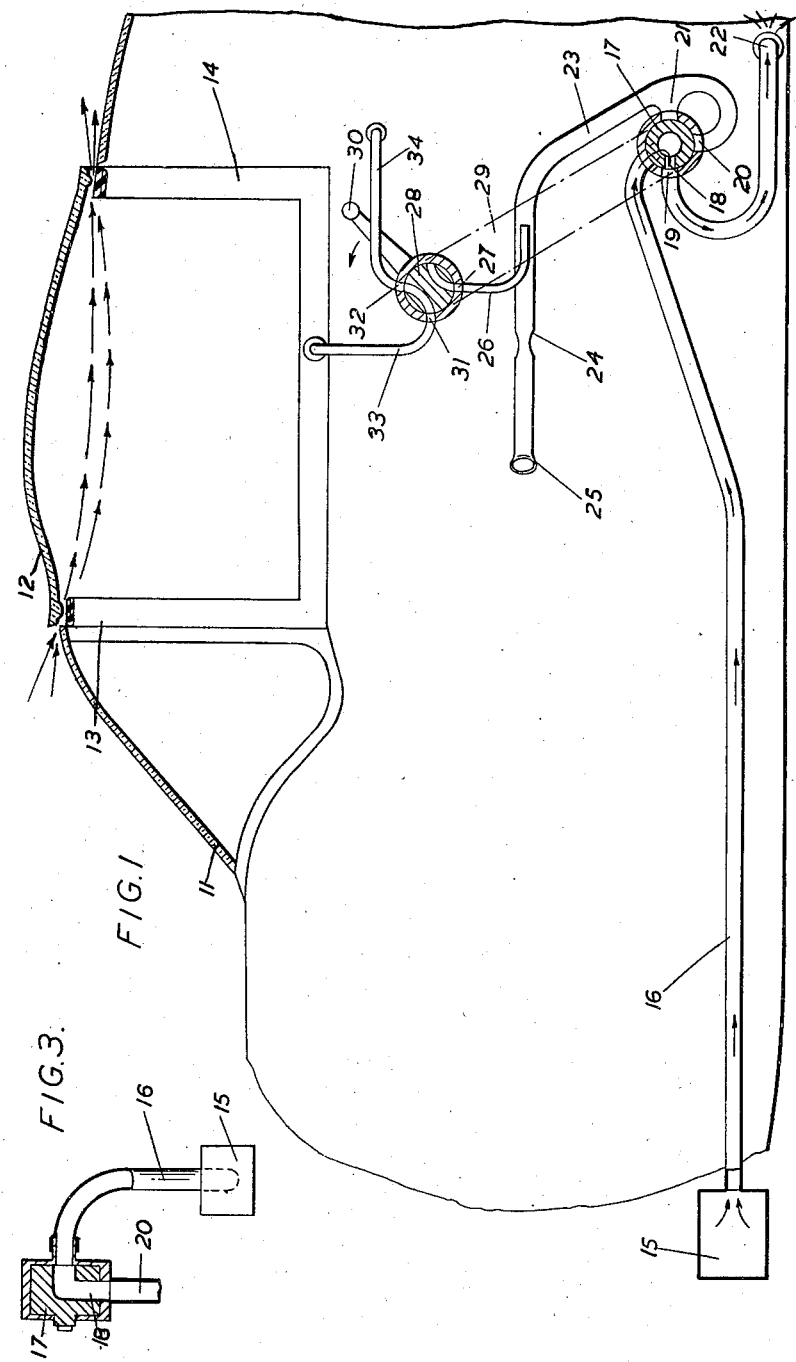
Inventor
MARCEL JULES ODILON LOBELLE
By
Attorney June 5, 1945.  M. J. O. LOBELLE  2,377,794
APPARATUS FOR SUPPLYING PRESSURE AIR
TO AIRCRAFT, VEHICLES, AND BOATS
Filed April 17, 1943   2 Sheets-Sheet 2
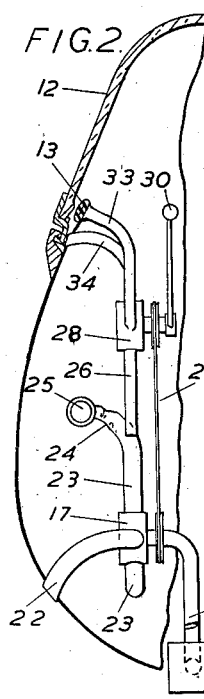
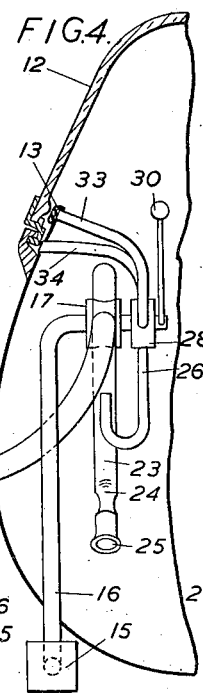
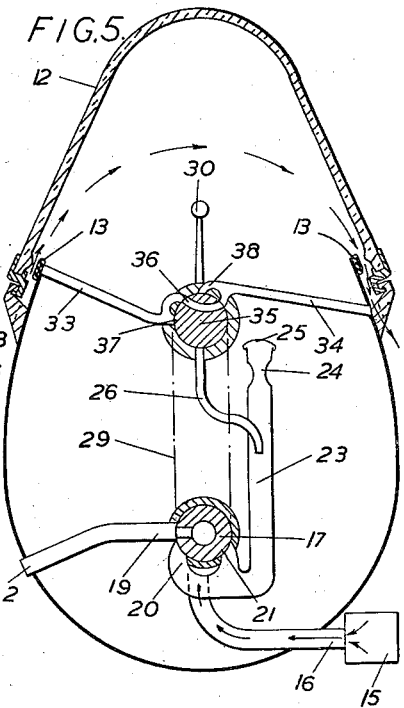
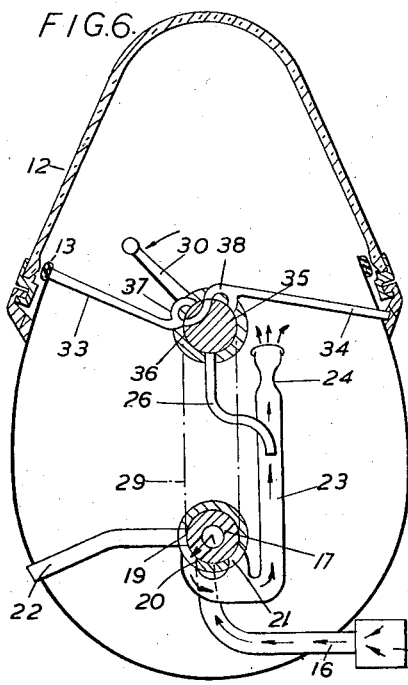
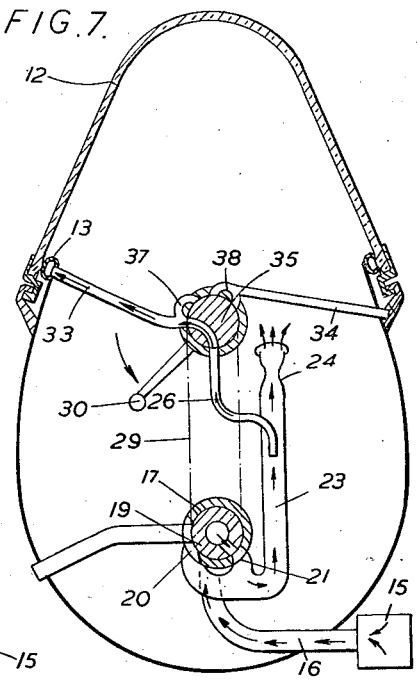
Inventor
MARCEL JULES ODILON LOBELLE
By
Attorney Patented June 5, 1945

2,377,794

UNITED STATES PATENT OFFICE 2,377,794

APPARATUS FOR SUPPLYING PRESSURE AIR TO AIRCRAFT, VEHICLES, AND BOATS

Marcel Jules Odilon Lobelle, Slough, England, assignor to Messrs. R. Malcolm Limited, Slough, England, a British company Application April 17, 1943, Serial No. 483,428
In Great Britain November 18, 1942

7 Claims. (Cl. 98—1.5)

This invention relates to ventilating and pressure-maintaining apparatus for aircraft and vehicles generally, motor boats and the like. It is applicable in any case where it is desirable to supply air under a slight pressure for ventilating purposes to an enclosed compartment or to supply air under considerable pressure as in the case of the cockpit of an aeroplane intended to fly at great heights. It will be convenient to describe the invention as applied to the cockpit of an aeroplane, but it will be understood that its application is not limited thereto.

In the case of the cockpit of an aeroplane there is usually a sliding hood which normally covers the pilot but it can be pushed back whenever required, for example to let the pilot get in and out or when in flight in case the pilot has to make a parachute descent. The hood slides on rails which can be released if the hood is to be discarded at any time. When the hood comes to its closed position the two sides and the arched ends at the front and rear can be closed airtightly by inflating a rubber tyre or tube which is normally flattened, but can be expanded by air under pressure within it so that it bears against the internal faces of the framework of the hood. In this way an airtight joint can be made which will withstand an internal pressure of say 4 or 5 lbs. per square inch or more if required. When the tyre is deflated it will permit air for ventilation to enter and escape around the edges of the hood.

It is the principal object of the present invention to provide convenient valves and control mechanism whereby the pilot or operator can control the flow of air supplied under pressure, so that either the air is discharged unused, or is delivered to the cockpit while the hood is not sealed by the tyre so that the air escapes around the hood, or is delivered to the cockpit while the hood is sealed so as to build up any desired pressure of air therein. A further object is to enable the pressure air supply to be used for inflating the tyre which seals the hood when closed, for which purpose such air may be delivered to the cockpit through a choke which reduces the pressure to some extent before delivery, while a branch leading out in advance of the choke conveys air under the supply pressure to the tyre, thus tending to inflate the tyre to a pressure a little above that maintained in the cockpit or cabin. These and other objects are attained by the apparatus hereinafter described with reference to the accompanying drawings, in which:

Figure 1 is a diagrammatic longitudinal sectional view of the cockpit of an aeroplane, showing the invention applied thereto;

Figure 2 is a partial end view of the mechanism shown in Figure 1;

Figure 3 is a sectional detail view;

Figure 4 is a similar view to Figure 2 showing a modification;

Figures 5, 6 and 7 are transverse sectional views of the cockpit of an aeroplane, with a modified form of the invention applied thereto, and showing the valves in three different positions.

Referring first to Figures 1 and 2, the cockpit of an aeroplane there illustrated has a sight screen at 11, and a sliding hood 12 which can be sealed around its sides, and ends by an inflatable tyre or tube 13. When this tyre is deflated as shown it permits outside air to pass under the hood for ventilation purposes as indicated by the arrows in Figure 1, even when the hood is in its forward or closed position. The hood 12 can be pushed backwards over the fixed canopy 14 at the back when required to permit the pilot to enter or leave the cockpit.

Air under pressure, and heated if required, is supplied in the known manner from a source indicated at 15, generally from a compressor driven by the engine, through a pipe 16 to the interior of a rotary valve 17, as seen in Figure 3. This valve has a single outlet aperture 18 which can be brought into register with any of three ports 19, 20 and 21. The port 19 leads to a main exhaust 22, while both ports 20 and 21 are connected to a pipe 23 for delivering air to the cockpit. This pipe has a choke at 24 and an orifice at 25. At the rear of the choke is a smaller branch pipe 26 which communicates with the port 27 of another rotary valve 28. The valves 28 and 17 may be linked for simultaneous operation through a gear chain 29 or other suitable linkage, a handle 30 being provided on the spindle of valve 28. This valve has ports 31 and 32, of which 31 communicates through pipe 33 with the tyre 13 for inflation purposes, while port 32 communicates through pipe 34 with an exhaust outlet.

With the handle 30 in the position shown in Figure 1 the air under pressure from pipe 16 passes through valve 17 to the exhaust outlet 22 and no air is delivered through pipe 23 to the cockpit. The tyre 13 is exhausted through pipe 33, valve 28 and pipe 34, so that the hood 12 is not sealed, and is open to external ventilation as indicated in Figure 1. On turning the handle about 90° toward the left in Figure 1, valve 17 communicates with port 20 and pipe 23, delivering air under pressure to the cockpit, while the passage in valve 28 connects to ports 27 and 31, so delivering air under a slightly higher pressure from behind the choke 24 to the tyre 13, and inflating it to seal the cockpit so that it will hold its air under pressure. By turning back the handle 30 through a partial turn the operator can cut off the pressure air supply from port 20 without exhausting the tyre through passage 32, so that the pressure already reached in the cockpit can be maintained, and it need not be the maximum supply pressure. On turning the handle 30 forwardly through a further angle, the valve 17 will communicate with port 21, so continuing to deliver air through pipe 23 to the cockpit, but valve 28 now obstructs the delivery of air from pipe 26, and connects the pipe 33 to pipe 34 so discharging the air pressure from the tyre 13. The tyre is therefore deflated, and the cockpit is kept at atmospheric pressure substantially, although it is supplied with warmed air under slight pressure from the pipe 23, the excess air escaping round the edges of the hood 12.

Figure 4 shows a modification in which the gear 29 is dispensed with, the two valves 17 and 28 being in line with one another on the one spindle. The parts are numbered to correspond with Figures 1 and 2, as apart from this change of location of valve 28 they are the same as already described.

Figures 5, 6 and 7 illustrate a modified form of valve mechanism in the cockpit of an aeroplane, shown in transverse section, the valves being shown in section to indicate their three normal operative positions. The following parts are numbered to correspond with Figures 1 to 3 as they are unaltered, namely the hood 12, tyre 13, source of pressure air 15, pipe 16, valve 17, aperture 18 and ports 19, 20, 21, exhaust 22, pipe 23, choke 24, pipe 26, chain gear 29, handle 30, and pipes 33 and 34. The valve 35 replaces valve 28 of Figures 1 to 3, and it has a single passage 36, which can communicate with ports 37 leading to pipe 33, and ports 38 leading to pipe 34, and with the pipe 26.

In the position of Figure 5, with the handle 30 upright, the tyre 13 is exhausted through pipe 33, ports 37, passage 36 in valve 35, ports 38 and pipe 34, while the pressure air from pipe 16 is discharged via valve 17 and port 19 to exhaust at 22.

In the position of Figure 6, in which the handle 30 has been turned part way down toward the left, the tyre 13 is still connected to exhaust through 33, 37, 38 and 34, so that the hood 12 allows air to escape, but air which may be warmed from pipe 16 is supplied to the cockpit via valve 17, port 20 and pipe 23.

In the position of Figure 7, in which the handle 30 has been turned further down toward the left, air under pressure is supplied from valve 17 through port 21 and pipe 23 to the cockpit, and air diverted through branch pipe 26 is delivered through valve passage 36 and port 37 to the tyre 13 whereby this is inflated and the hood 12 is sealed round its edges to hold the air under pressure.

By turning valves 17 and 35 back to an intermediate position in which the aperture 18 is between the ports 20 and 21, and the passage 26 is out of connection with pipe 26, it is possible to keep air under some pressure in the cockpit, not necessarily at the full supply pressure, the handle being turned for a short time to the position of Figure 7 and then moved back again a few degrees for this purpose. Of course the air leaks away gradually from the cockpit and the valve will need turning to the position of Figure 7 from time to time for short periods if a pressure is to be maintained in the cockpit.

It will be understood that in any of the constructions hereinbefore described, when the tyre 13 is inflated it seals the hood 12 around its edges and prevents it from moving, although the hood can still be discarded as a whole in the known manner in case of emergency, but when the tyre 13 is deflated the hood can be slipped back and forward freely on its guide rails as usual at the will of the pilot or operator.

Any suitable compressor plant may be used to supply the air pressure, the air being generally warmed by the heat of the engine or its exhaust. The invention has been described on the supposition that the compressor is always working delivering air, but a separate control may be provided for stopping or starting the compressor or for cutting off its connection to the cockpit when not required.

Although the invention has been described primarily as applied to aeroplanes, it will be evident that it can also be used in positions where a pilot, observer, gunner or the like is in a confined position under a releasable cover and it is desired to provide him with means for maintaining a supply of fresh air under his control. Such conditions may arise not only in aeroplanes but in tanks for example, and on other land vehicles, and in motor torpedo boats or other seagoing craft. The details of construction of course can be modified to suit the particular application of the invention, and it may be that instead of a sliding hood some other form of cover or window which has to be sealed by an inflatable gasket or the like will be used.

I claim:

1. Ventilating and pressure-maintaining device for the cabins of aircraft, vehicles or boats, comprising a hood and inflatable means for sealing the edges of said hood, a source of pressure air, conduits between said source and inflatable means and cabin valve mechanism in said conduits and manual means for controlling said valve mechanism within said cabin, said valve mechanism including ports which in one position of said manual means of control cut off said pressure air supply, in another position permit said pressure air to enter said cabin but leave said inflatable sealing means deflated, and in still another position maintain the supply of said pressure air both to the cabin and to said inflatable sealing means.

2. Ventilating and pressure-maintaining device for the cabins of aircraft, vehicles or boats, comprising a hood and inflatable means for sealing the edges of said hood, a source of pressure air, conduits between said source and inflatable means and cabin valve mechanism in said conduits and manual means for controlling said valve mechanism within said cabin, said valve mechanism including ports which in one position of said manual means of control cut off said pressure air supply, in another position permit said pressure air to enter said cabin but leave said inflatable sealing means deflated, in still another position maintain the supply of said pressure air both to the cabin and to said inflatable sealing means, and in another position cut off the supply of further pressure air to said cabin while still maintaining said inflatable sealing means inflated.

3. Ventilating and pressure-maintaining device for the cabins of aircraft, vehicles or boats, comprising a hood and inflatable sealing means adapted to seal the edges of said hood in a substantially airtight manner, a source of pressure air, conduits between said source and inflatable sealing means and cabin, a valve in said conduits adapted to control the supply of said pressure air to said cabin, a second valve adapted to control the supply of pressure air to said inflatable sealing means, manual means of control for said valves adapted in one position to cut off the supply of pressure air, in another position to supply pressure air to said cabin but not to said inflatable sealing means, and in a third position to supply pressure air both to said cabin and to said inflatable sealing means.

4. Ventilating and pressure-maintaining device for the cabins of aircraft, vehicles or boats, comprising a hood and inflatable sealing means adapted to seal the edges of said hood in a substantially airtight manner, a source of pressure air, conduits between said source and inflatable sealing means and cabin, a valve in said conduits adapted to control the supply of said pressure air to said cabin, a second valve adapted to control the supply of pressure air to said inflatable sealing means, manual means of control for said valves adapted in one position to cut off the supply of pressure air, in another position to supply pressure air to said cabin but not to said inflatable sealing means, in a third position to supply pressure air both to said cabin and to said inflatable sealing means, and when turned back part way from said third position to stop the supply of pressure air to said cabin while leaving said inflatable sealing means inflated.

5. Ventilating and pressure-maintaining device for the cabins of aircraft, vehicles or boats, comprising a hood and inflatable sealing means adapted to seal the edges of said hood in a substantially airtight manner, a source of pressure air, a valve adapted to control the supply of pressure air to said cabin, a pipe with a constriction in it through which said pressure air is delivered to said cabin, a second valve, a branch leading out from said pipe before said constriction to an inlet port of said second valve, connections from said second valve to said inflatable sealing means, and manual means of control for said valves adapted in one position of said valves to cut off the supply of pressure air, in another position to permit the supply of pressure air to said cabin but not to said inflatable sealing means, and in a third position to supply pressure air to said cabin and also through said branch and said second valve to said inflatable sealing means.

6. Ventilating and pressure-maintaining device for the cabins of aircraft, vehicles or boats, comprising a hood and inflatable sealing means adapted to seal the edges of said hood in a substantially airtight manner, a source of pressure air, a valve adapted to control the supply of pressure air to said cabin, a pipe with a constriction in it through which said pressure air is delivered to said cabin, a second valve, a branch leading out from said pipe before said constriction to an inlet port of said second valve, connections from said second valve to said inflatable sealing means and to exhaust respectively, and manual means of control for said valves adapted in one position of said valves to cut off the supply of pressure air while connecting said inflatable sealing means to exhaust through said second valve, in another position to permit the supply of pressure air to said cabin but not to said inflatable sealing means, and in a third position to supply pressure air to said cabin and also through said branch and said second valve to said inflatable sealing means.

7. Ventilating and pressure-maintaining device for the cabins of aircraft, vehicles or boats, comprising a hood and inflatable sealing means adapted to seal the edges of said hood in a substantially airtight manner, a source of pressure air, a valve adapted to control the supply of pressure air to said cabin, a pipe with a constriction in it through which said pressure air is delivered to said cabin, a second valve, a branch leading out from said pipe before said constriction to an inlet port of said second valve, connections from said second valve to said inflatable sealing means and to exhaust respectively, and manual means of control for said valves adapted in one position of said valves to cut off the supply of pressure air while connecting said inflatable sealing means to exhaust through said second valve, in another position to permit the supply of pressure air to said cabin but not to said inflatable sealing means, in a third position to supply pressure air to said cabin and also through said branch and said second valve to said inflatable sealing means, and in a fourth position to cut off the supply of pressure air to said cabin and to said inflatable sealing means without connecting said second valve to exhaust.

MARCEL JULES ODILON LOBELLE.